Sept. 6, 1966   G. J. LACHANCE   3,270,454
PUSHER HANDLE CONSTRUCTION FOR GROCERY CARTS
Filed March 2, 1964
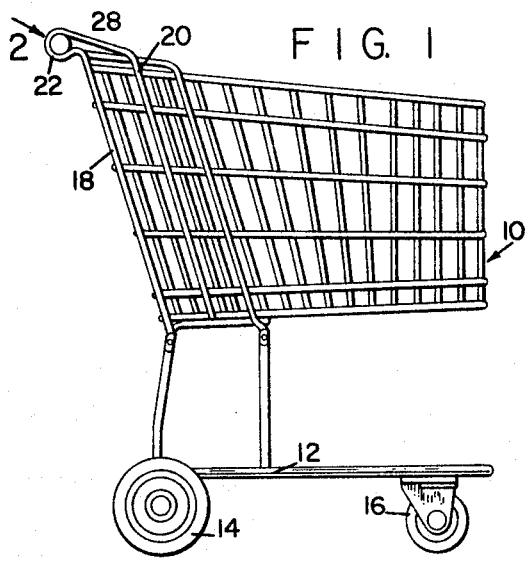
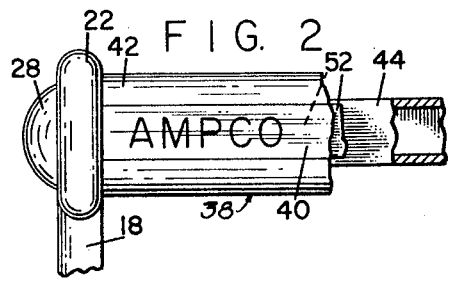
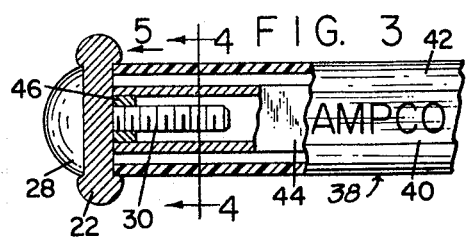
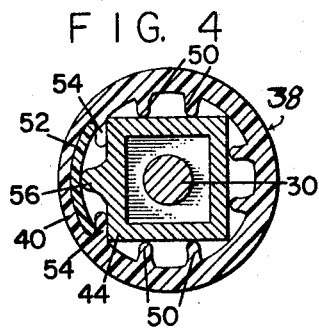
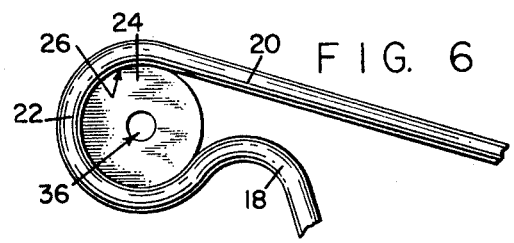
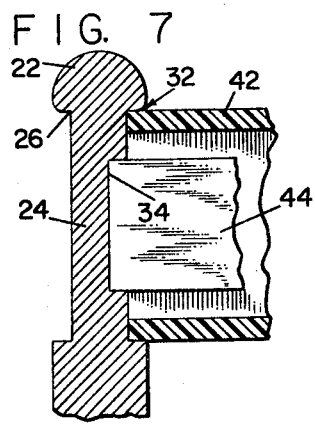
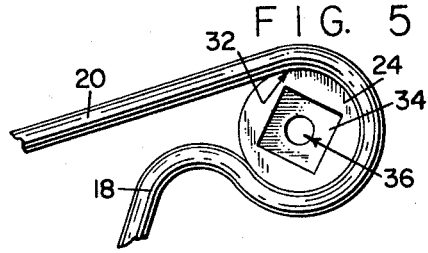
INVENTOR
GERALD J. LACHANCE
BY Charles R. Fay,
ATTORNEY

United States Patent Office 3,270,454
Patented Sept. 6, 1966

3,270,454
PUSHER HANDLE CONSTRUCTION FOR GROCERY CARTS
Gerald J. Lachance, North Brookfield, Mass., assignor to Armand A. Lachance, Auburn, Mass.
Filed Mar. 2, 1964, Ser. No. 348,600
6 Claims. (Cl. 40—308)

This invention relates to a new and improved handle construction for grocery carts, etc., and the principal object of the invention resides in the provision of an improved pusher handle with provision for accepting and changing information such as the name of the owner, store, etc., this information appearing on a narrow elongated strip which is slipped into a plastic tube forming the outside of the handle, the tube being held at its ends to portions of the grocery cart and having a major opaque longitudinal portion and a narrow longitudinal transparent portion, so that the information on the strip recited above may be held and protected within the tube and observed through the transparent area thereof, in combination with means mounting the plastic tube interiorly thereof, said means being strong and sturdy and preventing the user of the grocery cart from rotating the handle in any way, such rotation of the handle being deleterious to the construction and resulting in failure of the parts and final disruption of the handle if continued.

Further objects of the invention reside in the provision of a handle construction for grocery carts, etc., as before recited including a non-circular inner strong tube having interengaging means with respect to the interior of the outer plastic tube above described, the non-circular tube being held by complementary non-circular means at the ends thereof to fixed parts of the cart and being incapable of rotation, so that the interengaging means between the non-circular tube and the outer plastic tube prevent rotation of any of the parts and consequent longer life of the handle construction.

Other objects and advantages of the invention will appear hereinafter.

Reference is to be had to the accompanying drawings, in which:

FIG. 1 is a view in side elevation illustrating a grocery cart with the new handle applied thereto;

FIG. 2 is a partial view in elevation with parts removed and in section and looking generally in the direction of arrow 2 in FIG. 1;

FIG. 3 is a view similar to FIG. 2 but having more parts in section and showing the interior construction;

FIG. 4 is an enlarged section on line 4—4 of FIG. 3;

FIG. 5 is a view in elevation, looking in the direction of arrow 5 in FIG. 3, and showing merely the end connection means for the non-circular interior tube;

FIG. 6 is a similar view but looking at the opposite side of the end holding means shown in FIG. 5, and FIG. 7 is a cross sectional view on an enlarged scale illustrating the connection between the ends of the non-circular tube and the holding means.

In illustrating the present invention, the same is shown as applied to a more or less conventional grocery cart or other cart used in self-service stores or the like and comprising a basket 10, an under carriage 12, rear wheels 14, front wheels such as casters 16, and a relatively sturdy framework comprising members 18 and 20 which serve to aid in holding the basket in position on the under-carriage 12 and also forming as at 22 a loop for holding the handle which is to be described. The members 18 and 20 and loop 22 appear at each side of the cart and its basket.

Referring now to FIGS. 5 and 6 where a loop 22 is shown in more detail, this loop is provided with a metal plate 24, or sufficient metal may be obtained by stamping the material of the loop forcing it inwardly to form the disc. This disc at the outer aspect of the loop 22 is formed with a circular indentation at 26 for the purpose of receiving the head of a bolt or the like 28, bolt 28 having an elongated threaded portion 30, see FIG. 3. At its inner aspect the disc 24 is provided also with a circular indentation 32 and a further square indentation 34. Centrally of disc 24 there is an opening 36 through which the threaded portion 30 of the bolt 28 passes.

There is provided a plastic tube generally indicated by the reference numeral 38. This has a relatively narrow elongated clear transparent area at 40 extending from end to end thereof and the remainder of the tube as at 42 may be opaque in order to provide a good appearance and to conceal the inner tube 44 which is to be described.

Inner tube 44 is preferably made of metal and is non-circular in shape being shown as square in FIG. 4. This tube is held at its ends in the sockets provided by the non-circular indentations 34 and when bolts 28 are applied to fixed threaded plates 46 at the ends of the tube 44 it will be seen that the tube 44 is held strictly in fixed position relative to the end loops 22 of wires 18 and 20.

The plastic tube is extruded with a series of inwardly extending ribs 50, 50 and when the tube 44 is slid within tube 42, these ribs contact the sides of tube 44, thus restraining the outside tube from any rotational motion with respect to the inner tube 44. Therefore it will be seen that the outer tube although cylindrical is held in fixed position as desired by the construction including tube 44 and the end sockets 34 in discs 24.

Various means may be provided for holding a printed strip 52 in position under the transparent areas 40. As one means for holding this strip in position, a pair of inwardly extending projections or ribs 54 can be extruded when the tube is made, see FIG. 4, and these hold the side edges of strip 52 in position and do not allow it to become forced inwardly so that it leaves the inner surface of tube 42 in the area 40. The transparent portion of the tube 42 extends from one rib 54 to the other. Also if desired the metal tube 44 can be provided with an outwardly projecting rib 56 which contacts the inner surface of the strip 52 and holds it in position as shown in FIG. 4.

Having thus described my invention and the advantages thereof, I do not with to be limited to the details herein disclosed, otherwise than as set forth in the claims, but what I claim is:

1. A pusher handle construction for a cart wherein said cart includes a basket, means forming a pair of narrow spaced loops on said basket, and a plastic tube extending between and held by said loops, said plastic tube having a transparent area, a removable printed member in the sube, the printing on the member appearing through the transparent area thereof, means holding the printed member in generally fixed position in the tube and securing the ends of the tube with respect to said loops, said means comprising a non-circular tube within the first tube and means on the loops having mating portions engaging the ends of and securing said non-circular tube in non-rotative position with respect thereto, the printed member lying on and being generally confined by a non-circular surface of the non-circular tube.

2. The grocery handle construction recited in claim 1 including means fixing the first tube in non-rotative relation to the non-circular tube, said last-named means comprising interengaging members between the two tubes preventing rotation of the plastic tube with respect to the inner tube.

3. The grocery handle construction recited in claim 1 including means fixing the first tube in non-rotative relation to the non-circular tube, said last-named means in cluding longitudinal ribs on one tube substantially contacting the other tube.

4. The grocery handle construction recited in claim 1 including means fixing the first tube in non-rotative relation to the non-circular tube, said last-named means including longitudinal ribs on the plastic tube substantially engaging a surface of said non-circular tube.

5. A handle construction for carts comprising a basket, spaced means on the basket for securing a handle therebetween, the handle comprising a pair of tubes, one within the other, the inner tube being non-circular in section, complementary non-circular means engaging the ends of the inner tube and maintaining the same against rotation, and generally longitudinally arranged ribs on the outer tube contacting the inner tube and maintaining the outer tube rotatively fixed with relation to the inner tube.

6. A grocery cart construction as recited in claim 5 in which said ribs appear at the inner surface of the outer tube and engage the outer surface of the non-circular tube.

References Cited by the Examiner
UNITED STATES PATENTS

| | | | |
|---|---|---|---|
| 2,896,348 | 7/1959 | Herne | 40—334 |
| 2,918,741 | 12/1959 | Welter et al. | 40—308 |
| 3,115,720 | 12/1963 | Lachance | 40—308 |

EUGENE R. CAPOZIO, *Primary Examiner.*

WILLIAM GRIEB, *Examiner.*